United States Patent
Peng et al.

(10) Patent No.: US 10,320,270 B2
(45) Date of Patent: Jun. 11, 2019

(54) HYBRID DUAL-ROTOR STRUCTURE

(71) Applicant: Industrial Technology Research Institute, Hsin-Chu (TW)

(72) Inventors: Ming-Tsan Peng, Taoyuan County (TW); Shian-Hsuan Huang, Hsinchu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 615 days.

(21) Appl. No.: 14/968,182

(22) Filed: Dec. 14, 2015

(65) Prior Publication Data

US 2017/0104398 A1 Apr. 13, 2017

(30) Foreign Application Priority Data

Oct. 13, 2015 (TW) .............................. 104133582 A

(51) Int. Cl.
| | |
|---|---|
| *H02K 16/02* | (2006.01) |
| *H02K 3/28* | (2006.01) |
| *H02P 25/18* | (2006.01) |
| *H02K 21/16* | (2006.01) |
| *H02K 21/22* | (2006.01) |

(52) U.S. Cl.
CPC .............. *H02K 16/02* (2013.01); *H02K 3/28* (2013.01); *H02P 25/18* (2013.01); *H02K 21/16* (2013.01); *H02K 21/22* (2013.01)

(58) Field of Classification Search
CPC ................................. H02K 16/02; H02K 3/28
USPC ................. 310/114, 205, 266, 179
See application file for complete search history.

(56) References Cited

U.S. PATENT DOCUMENTS

| 3,171,049 A | * | 2/1965 | Jean Jarret ............. H02K 19/24 |
|---|---|---|---|
| | | | 310/114 |
| 6,531,799 B1 | | 3/2003 | Miller |
| 6,924,574 B2 | | 8/2005 | Qu et al. |
| (Continued) | | | |

FOREIGN PATENT DOCUMENTS

| CN | 1574565 | 2/2005 |
|---|---|---|
| CN | 101034823 B | 5/2010 |
| (Continued) | | |

OTHER PUBLICATIONS

Longya Xu, "A New Breed of Electric Machines—Basic Analysis and Applications of Dual Mechanical Port Electric Machines", Sep. 27, 2005, pp. 24-31 vol. 1, IEEE, Ohio State University, USA.

(Continued)

*Primary Examiner* — Terrance L Kenerly
(74) *Attorney, Agent, or Firm* — WPAT, PC

(57) ABSTRACT

A hybrid dual-rotor motor structure is provided, which may include a stator, a first rotor, a second rotor, a first coil, and a second coil. The stator may include a plurality of stator teeth. The first rotor, the second rotor, and the stator may arranged in the radial direction of the hybrid dual-rotor motor structure. The first coil may be wound on the stator teeth. The second coil may be wound on the stator teeth; the second coil may include a plurality of sub-coil sets; each of the sub-coil sets may include a plurality of sub-coils connected to each other/one another in series or in parallel; the pole-pair number of the second coil may be the integral multiple of the pole-pair number of the first coil.

18 Claims, 6 Drawing Sheets

(56) References Cited

U.S. PATENT DOCUMENTS

| | | | |
|---|---|---|---|
| 7,030,528 B2 | 4/2006 | Morgante | |
| 7,355,311 B2 * | 4/2008 | Shimizu | H02K 1/182 310/156.37 |
| 7,521,835 B2 * | 4/2009 | Qu | H02K 3/28 310/184 |
| 7,911,175 B2 * | 3/2011 | Fargo | H02K 17/06 310/179 |
| 8,575,810 B2 | 11/2013 | Nishiyama | |
| 8,816,554 B2 | 8/2014 | Li et al. | |
| 8,930,055 B2 | 1/2015 | Yuan | |
| 2004/0080237 A1 * | 4/2004 | Han | H02K 1/143 310/266 |
| 2007/0205683 A1 * | 9/2007 | Kawamura | H02K 21/029 310/114 |
| 2009/0134735 A1 * | 5/2009 | Yoshikawa | H02K 16/02 310/198 |
| 2011/0227523 A1 | 9/2011 | Grantz | |
| 2011/0273128 A1 * | 11/2011 | Nishiyama | H02K 21/222 318/720 |
| 2012/0001508 A1 * | 1/2012 | Mantere | H02K 1/278 310/156.12 |
| 2013/0093276 A1 | 4/2013 | Kim | |
| 2014/0232228 A1 * | 8/2014 | Watanabe | B60K 6/26 310/112 |

FOREIGN PATENT DOCUMENTS

| | | | |
|---|---|---|---|
| CN | 201504159 U | 6/2010 | |
| CN | 101778728 A | 7/2010 | |
| CN | 102099984 | 6/2011 | |
| CN | 103346655 | 10/2013 | |
| GB | 965899 * | 3/1963 | H02P 23/16 |
| JP | 57-101593 A | 6/1982 | |
| JP | 57101593 * | 6/1982 | H02K 17/08 |
| TW | I338434 | 3/2011 | |
| TW | 201301717 | 1/2013 | |
| TW | 201519572 | 5/2015 | |

OTHER PUBLICATIONS

Guo et al. "Comparison of Two Different Structure of Permanent Magnet Dual Mechanical Port Machine", Sep. 3, 2008, IEEE Vehicle Power and Propulsion Conference, Harbin, China.

Xu et al. "Multi-operational Modes and Control Strategies of Dual-Mechanical-Port Machine for Hybrid Electrical Vehicles", Sep. 3, 2008, pp. 1710-1717, IEEE, New Orleans, Louisiana, USA.

Ansari et al. "Performance Analysis of a Hybrid Dual Rotor Motor for Electric Vehicle Application", Sep. 2, 2012, pp. 2002-2007, IEEE, Marseille, Franca.

Ehsani et al. "Propulsion System Design of Electric and Hybrid Vehicles", Feb. 1997, pp. 19-27, IEEE, Industrial Electronics Society.

Cui et al. "Research on Switched Reluctance Double-rotor Motor Used for Hybrid Electric Vehicle", Oct. 17, 2008, pp. 3393-3396, IEEE, Wuhan, China.

Taiwan Intellectual Property Office (TIPO), Office Action daed May 10, 2016.

Xu et al. "Multi-operational Modes and Control Strategies of Dual-Mechanical-Port Machine for Hybrid Electrical Vehicles", Sep. 3, 2008, pp. 1-5, IEEE, New Orleans, Louisiana, USA.

Ansari et al. "Performance Analysis of a Hybrid Dual Rotor Motor for Electric Vehicle Application", Sep. 2, 2012, pp. 2002-2007, IEEE, Marseille, France.

State Intellectual Property Office of the People's Republic of China, "Office Action", dated May 29, 2018.

* cited by examiner

13A

13B

HYBRID DUAL-ROTOR STRUCTURE

CROSS REFERENCE TO RELATED APPLICATION

This application claims the benefit of Taiwan Patent Application No. 104133582, filed on Oct. 13, 2015, in the Taiwan Intellectual Property Office, the disclosure of which is incorporated herein in its entirety by reference.

TECHNICAL FIELD

The present disclosure relates to a motor structure, in particular to a hybrid motor structure.

BACKGROUND

In general, a motor with two rotors should have two corresponding stators, and each of the stators should have coil to drive the corresponding rotor; however, the above design will significantly increase the size, weight and cost of the motor; on the other hand, the above design cannot provide high torque in low speed and wide speed region.

However, in-wheel motor of electric motor, integrated starter generator and other similar applications are required to be of small size and light in weight; besides, they also need to provide high torque in low speed and achieve wide speed region; therefore, it is a great challenge to design a motor capable of meeting the above requirements.

Currently, many different motors have been developed for the above applications. For example, US patent publication No. 20130093276 provides a double-stator/double-rotor type motor; U.S. Pat. No. 7,030,528 provides a dual concentric AC motor; Taiwan patent publication No. 6924574 provides a dual-rotor, radial-flux, toroidally-wound, permanent-magnet machine. However, the above motors still have a lot of shortcomings to be overcome.

SUMMARY

The present disclosure is related to a hybrid dual-motor structure. In one embodiment of the disclosure, the hybrid dual-motor may include a stator, a first rotor, a second rotor, a first coil, and a second coil. The stator may include a plurality of stator teeth. The first rotor, the second rotor, and the stator may arranged in the radial direction of the hybrid dual-rotor motor. The first coil may be wound on the stator teeth. The second coil may be wound on the stator teeth; the second coil may include a plurality of sub-coil sets; each of the sub-coil sets may include a plurality of sub-coils connected to each other/one another in series or in parallel; the pole-pair number of the second coil may be the integral multiple of the pole-pair number of the first coil, and there is a substantial magnetic flux linkage between the first coil and the second coil.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
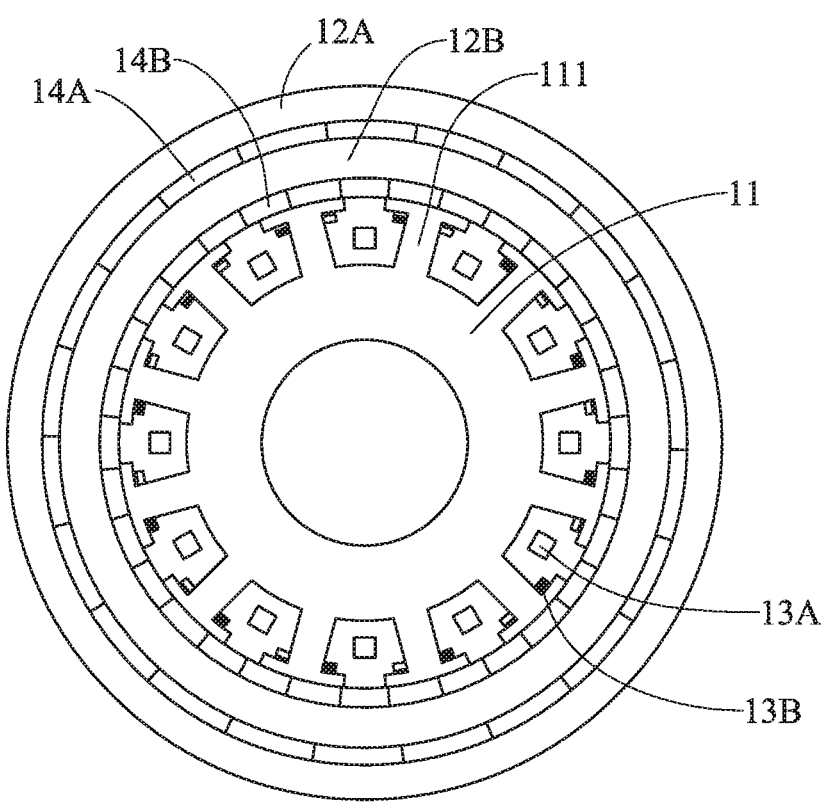
FIG. 1 is the first schematic view of the first embodiment of the hybrid dual-rotor motor structure in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is the first schematic view of the first embodiment of the hybrid dual-rotor motor structure in accordance with the present disclosure. As shown in FIG. 1, the hybrid dual-rotor motor 1 may include a stator 11, a first rotor 12A, a second rotor 12B, a first coil 13A, and a second coil 13B, a first magnet set 14A, and a second magnet set 14B.

The stator 11, the first rotor 12A, and the second rotor 12B may be arranged in the radial direction of the hybrid dual-rotor motor 1; the stator 11 may include a plurality of stator teeth 111; the first magnet set 14A may be disposed around the inner surface of the first rotor 12A; the second magnet set 14B may be disposed around the inner surface of the second rotor 2B. In the embodiment, from the radial direction of the hybrid dual-rotor motor 1 to perceive, the stator 11 may be disposed inside the first rotor 12A and the second rotor 12B. In the embodiment, both the first rotor 12A and the second rotor 12B may be permanent-magnet rotor; in another preferred embodiment, one of the first rotor 12A and the second rotor 12B may be permanent-magnet rotor, and the other one of the first rotor 12A and the second rotor 12B may be induction rotor.

The first coil 13A may be wound on the stator teeth 111; the second coil 13B may be wound on the stator teeth 111. More specifically, the second coil 13B may include a plurality of sub-coil sets, and the sub-coil sets may be connected to each other/one another in series or in parallel; besides, the pole-pair number of the second coil 13B may be an integral multiple of the pole-pair number of the first coil 13A. The first coil 13A and the second coil 13B may be various different kinds of coils, such as toroidal coil, etc. In the embodiment, there may be a substantial magnetic flux linkage between the first coil 13A and the second coil 13B; however, the interference of the magnetic flux linkage between the first coil 13A and the second coil 13B cam be minimized by the above structure.

In addition, the first coil 13A may include a pole-changing structure; the pole-changing structure may include a plurality of switch elements; the pole-changing structure can change the pole number of the first coil 13A by switching the switch elements; similarly, the second coil 13B may also include a pole-changing structure; the pole-changing structure may include a plurality of switch elements; the pole-changing structure can change the pole number of the second coil 13B by switching the switch elements. Therefore, the hybrid dual-rotor motor 1 may provide more different dynamic characteristics by integrating the special pole-changing structure. The detailed technical content of the above pole-changing structure has been disclosed in Taiwan patent application No. 101129353, so will not be described herein.

Figure 2:
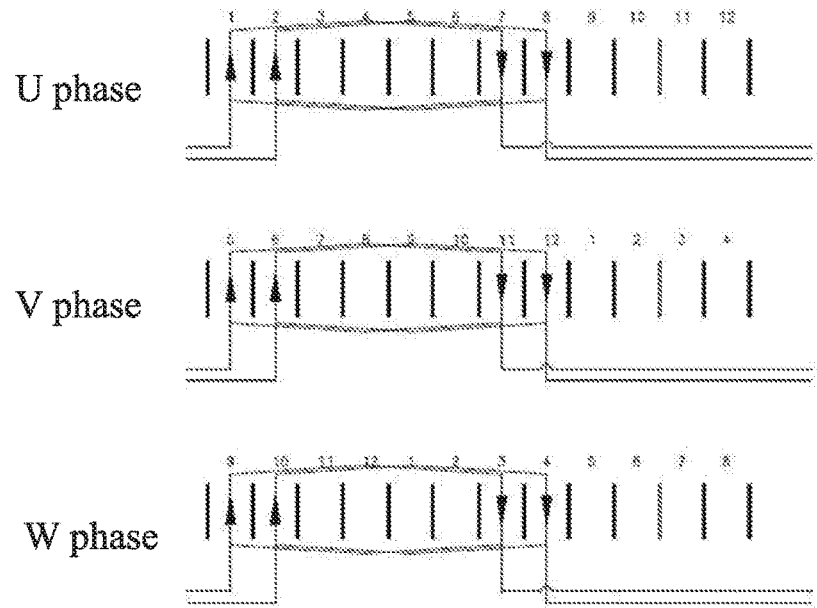
FIG. 2 is the second schematic view of the first embodiment of the hybrid dual-rotor motor structure in accordance with the present disclosure.
Figure 3:
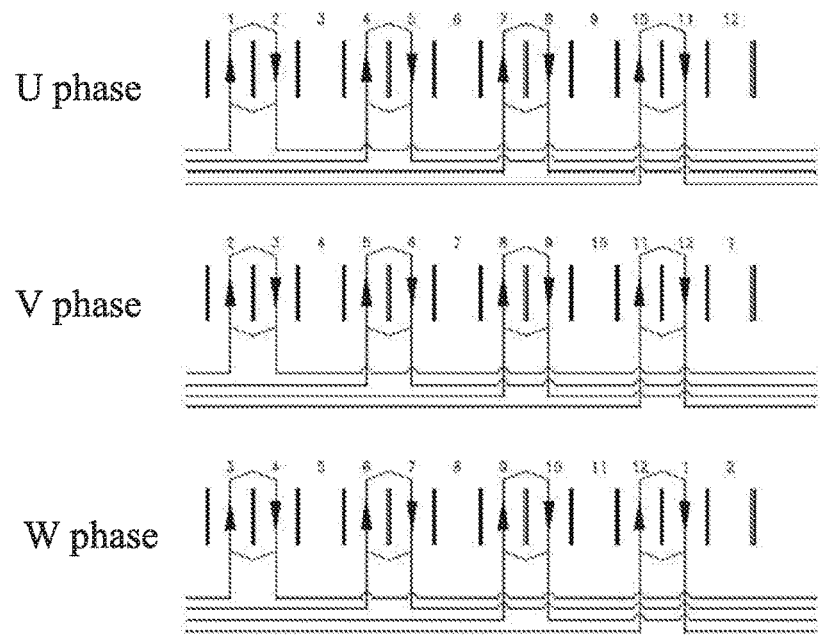
FIG. 3 is the third schematic view of the first embodiment of the hybrid dual-rotor motor structure in accordance with the present disclosure.

Please refer to FIG. 2 and FIG. 3, which are the first schematic view and the second schematic view of the first embodiment of the hybrid dual-rotor motor structure in accordance with the present disclosure. FIG. 2 and FIG. 3 illustrate the windings of the U-phase coil, V-phase coil and W-phase coil of the hybrid dual-rotor motor 1 of the embodiment.

As the stator of the hybrid dual-rotor motor 1 of the embodiment may include several coils, it is an important issue to minimize the interference of the magnetic flux linkage between these coils via proper magnetic pole relation; in this way, the independence of the hybrid dual-rotor motor 1 can be higher when the hybrid dual-rotor motor 1 is in operation. In other words, all of the U-phase coil, V-phase coil and W-phase coil of the hybrid dual-rotor motor 1 can be independently controlled to more accurately control the hybrid dual-rotor motor 1.

FIG. 2 illustrates the windings of the U-phase coil, V-phase coil and W-phase coil of the first coil 13A, wherein its pole-pair number S1 is 1; FIG. 3 illustrates the windings of the U-phase coil, V-phase coil and W-phase coil of the second coil 13B, wherein its pole-pair number S2 is 4; therefore, the pole-pair number of the second coil 13B is 4 times of the pole-pair number of the first coil 13A.

That is to say, when the pole-pair number S1 of the first coil 13A is 1, the pole-pair number S2 of the second coil 13B may be integer multiple of the pole-pair number S1 of the first coil 13, and the integer multiple may be greater than 1, as shown in the following equations:

S1 (the pole-pair number of the first coil 13A)=1;
S2 (the pole-pair number S2 of the second coil 13B)=n (n>1);

In the embodiment, the sum of the pole-pair number S1 of the first coil 13A and the pole-pair number S2 of the second coil 13B may be equal to the quantity of the stator teeth 111 of the stator 11; besides, the pole-pair number S2 of the second coil 13B may be equal to the pole-pair number of the second magnet set 14B; in this way, the interference of the magnetic flux linkage between the first coil 13A and the second coil 13B can be effectively decreased.

In another embodiment, the pole-pair number S1 of the first coil 13A may be greater than 1; similarly, the pole-pair number S2 of the second coil 13B may be integer multiple of the pole-pair number S1 of the first foil 13A, as shown in the following equations:

S1 (the pole-pair number of the first coil 13A)=q (q>1);
S2 (the pole-pair number of the second coil 13B)=nq (n>1);

However, the above structures are just from example instead of limitation; in other preferred embodiments, the pole-pair number S1 of the first coil 13A and the pole-pair number S2 of the second coil 13B may have different structures; the present invention will not be limited by the above structures.

As described above, so as to decrease the interference of the magnetic flux linkage between the first coil 13A and the second coil 13B, the embodiment provides several preferred coil structure. More specifically, in the embodiment, the pole-pair number of the second coil 13B may be the integral multiple of the pole-pair number of the first coil 13A, and the pole-pair number of the first coil 13A may be equal or greater than 1. Furthermore, the quantity of the sub-coil sets of the second coil 13B may be the factor of the integral multiple, and the factor may be greater than 1. For example, if the pole-pair number of the first coil 13A is S1 and the pole-pair number of the second coil 13B is S2, the quantity of the sub-coil sets of the second coil 13B is the factor of S2/S1, and the factor may be greater than 1; if S2/S1=6, the quantity of the sub-coil sets of the second coil 13B may be 2, 3, and 6.

By means of the above structure, the interference of the magnetic flux linkage between the first coil 13A and the second coil 13B of the hybrid dual-rotor motor 1 can be reduced, so the independence of the hybrid dual-rotor motor 1 can increase when operating in order to accurately control the hybrid dual-rotor motor 1 and better its performance.

Moreover, as the interference of the magnetic flux linkage between the first coil 13A and the second coil 13B has been effectively reduced, so the stator 11 does not need a non-magnetic layer; thus, the volume, weight, and cost of the hybrid dual-rotor motor 1 can be significantly decreased. However, the above structures are just for example instead of limitation; the present invention will not be limited by the above structures.

Figure 4:
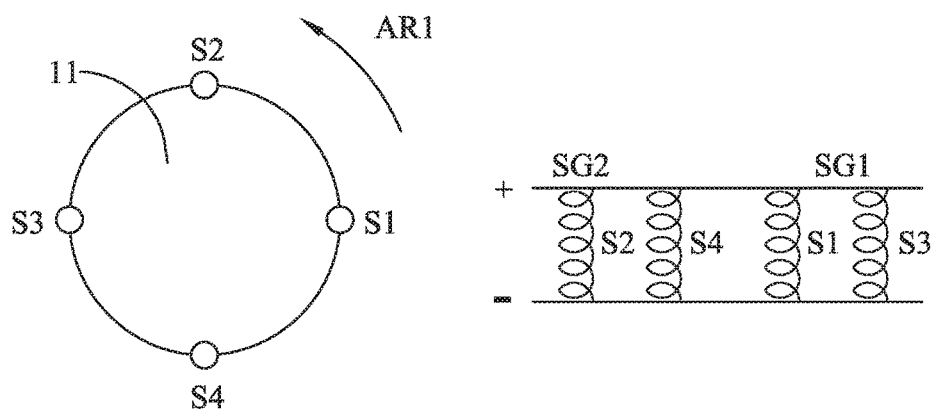
FIG. 4 is the fourth schematic view of the first embodiment of the hybrid dual-rotor motor structure in accordance with the present disclosure.
Figure 5:
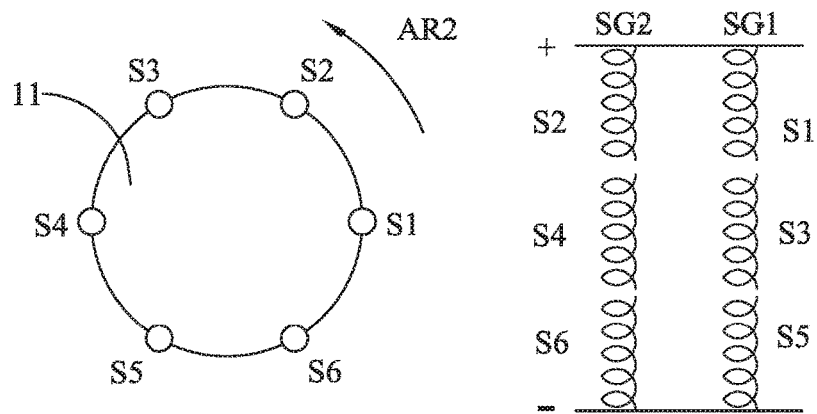
FIG. 5 is the fifth schematic view of the first embodiment of the hybrid dual-rotor motor structure in accordance with the present disclosure.

Please refer to FIG. 4 and FIG. 5, which are the fourth schematic view and the fifth schematic view of the first embodiment of the hybrid dual-rotor motor structure in accordance with the present disclosure. FIG. 4 and FIG. 5 illustrate several proper coil structures for the embodiment.

As described above, for the purpose of keeping good independence of the hybrid dual-rotor motor 1 to precisely and independently control the first rotor 12A and the second rotor 12B, it is very important to minimize the magnetic flux linage between the coils of the hybrid dual-rotor motor 1. In the embodiment, the special connection design of the sub-coils can further decrease the interference of the magnetic flux linkage between the coils of the hybrid dual-rotor motor 1; the embodiment illustrates several proper connection designs.

As shown in FIG. 4, the pole-pair number of the first coil 13A is 1 and the pole-pair number of the second coil 13B is 4; the second coil 13B may be a three-phase coil, including U-phase coil, V-phase and W-phase coil. The embodiment takes the U-phase coil of the second coil 13B as an example, which may include a plurality of sub-coils S1-S4 and these sub-coils S1-S4 may be wound on the stator 11. Any one of the sub-coil may be connected to the corresponding sub-coil in parallel to form a sub-coil set, and the quantity of the sub-coils of each of the sub-coil sets is 2; therefore, the second coil 13B may include a plurality of sub-coil sets SG1-SG2 and the sub-coil sets SG1-SG2 may be connected in parallel.

As shown in FIG. 4, the second coil 13B may include 4 sub-coils S1-S4; the sub-coil S1 may be connected to the corresponding sub-coil S3 in parallel to form the sub-coil set SG1; the sub-coil S2 may be connected to the corresponding sub-coil S4 in parallel to form the sub-coil set SG2; the sub-coil set SG1 and the sub-coil SG2 may be connected in parallel. The arrow AR1 shown in FIG. 4 means 0-360° of the electrical angle of the magnetic field of the first coil 13A.

As described above, when the quantity of the sub-coils of each of the sub-coil sets SG1-SG2 is even, and the sub-coils of each of the sub-coil sets SG1-SG2 are uniformly distributed around 0-360° of the mechanical angle of the periphery of the stator 11, or 0-360° of the electrical angle of the magnetic field of the first coil 13A, the sub-coils of each of the sub-coil sets SG1-SG2 may be connected in parallel, and the sub-coil sets SG1-SG2 may also be connected in parallel. In another embodiment, the sub-coil sets SG1-SG2 may also be connected in series. In still another embodiment, the sub-coils of each of the sub-coil sets SG1-SG2 may be connected in series, and the sub-coil sets SG1-SG2 may be connected in series or in parallel.

As shown in FIG. 5, the pole-pair number of the first coil 13A is 1 and the pole-pair number of the second coil 13B is 6; the second coil 13B may be a three-phase coil, including U-phase coil, V-phase and W-phase coil. The embodiment takes the U-phase coil of the second coil 13B as an example, which may include a plurality of sub-coils S1-S6 and these sub-coils S1-S6 may be wound on the stator 11; therefore, the second coil 13B may include a plurality of sub-coil sets SG1-SG2; the quantity of the sub-coils of each of the sub-coil sets SG1-SG2 is 3, and the sub-coil sets SG1-SG2 may be connected in parallel; the pole-pair number of the second coil 13B may be an integral multiple of the quantity of the sub-coils of each of the sub-coil sets SG1-SG2.

As shown in FIG. 5, the second coil 13B may include 6 sub-coils S1-S6; the sub-coil S1, sub-coil S3 and sub-coil S5 may be connected in series to form the sub-coil set SG1; the sub-coil S2, sub-coil S4 and sub-coil S6 may be connected in series to form the sub-coil set SG2; the sub-coil set SG1 and the sub-coil SG2 may be connected in parallel. The arrow AR2 shown in FIG. 5 means 0-360° of the mechanical angle of the periphery of the stator 11.

As described above, when the quantity of the sub-coils of each of the sub-coil sets SG1-SG2 is odd, and the sub-coils of each of the sub-coil sets SG1-SG2 are uniformly distributed around 0-360° of the mechanical angle of the periphery of the stator 11, or 0-360° of the electrical angle of the magnetic field of the first coil 13A, the sub-coils of each of the sub-coil sets SG1-SG2 may be connected in series, and the sub-coil sets SG1-SG2 may also be connected in parallel. In another embodiment, the sub-coil sets SG1-SG2 may also be connected in series. In still another embodiment, the sub-coils of each of the sub-coil sets SG1-SG2 may be connected in parallel, and the sub-coil sets SG1-SG2 may be connected in series or in parallel. Therefore, the above coil structure can always achieve great performance no matter whether the quantity of the sub-coils of each of the sub-coil set SG1-SG2 is even or odd.

To sum up, for the purpose of keeping high independence of the hybrid dual-rotor motor 1 and accurately controlling the hybrid dual-rotor motor 1 to respectively and independently control the first rotor 12A and the second rotor 12B, the embodiment provides a connection principle to achieve the above objects. If the pole-pair number S1 of the first coil 13A is 1 and the quantity of the sub-coils of the second coil 3B is n (n>1), there will be at least s kinds of serial connection methods, where s may be equal to the quantity of the factors of n except for 1; the set of the factor is A={$n_1$, $n_2$, ..., $n_s$}. For instance, when n=4, $n_1$=4, $n_2$=2 and s=2. If $n_i$=k, the k sub-coils should be uniformly distributed around the periphery of the stator 11, which may be around 0-360° of the of the mechanical angle of the periphery of the stator 11, or 0-360° of the electrical angle of the magnetic field of the first coil 13A. Besides, the k sub-coils may be divided into several sub-coil sets and each of the sub-coil sets may include several sub-coils connected in series or in parallel, and the sub-coil sets may be connected in parallel or in series.

If the pole-pair number S1 of the first coil 13A is q, q is greater than 1 and the quantity of the sub-coils of the second coil 13B is nq (n>1), there will be at least s kinds of serial connection methods, where s may be equal to the quantity of the factors of n except for 1; the set of the factor is A={$n_1$, $n_2$, ..., $n_s$}. For instance, when n=4, $n_1$=4, $n_2$=2 and s=2. If $n_i$=k, the k sub-coils should be uniformly distributed around 0-360° of the electrical angle of the magnetic field of the first coil 13A of the stator 11. Besides, the k sub-coils may be divided into several sub-coil sets and each of the sub-coil sets may include several sub-coils connected in series or in parallel, and the sub-coil sets may be connected in parallel or in series.

By means of the above structures, the interference of the magnetic flux linkage between the first coil 13A and the second coil 13B of the hybrid dual-rotor motor 1 may be minimized; accordingly, the independence of the hybrid dual-rotor motor 1 can be higher to more accurately control the hybrid dual-rotor motor 1 and better its performance.

Further, via the above structures, the stator 11 of the hybrid dual-rotor motor 1 can have various coil structures, which allows the hybrid dual-rotor motor 1 to have more different dynamic characteristics, so the hybrid dual-rotor motor 1 can more flexible in use, and its application can be more comprehensively.

Moreover, as the interference of the magnetic flux linkage between the first coil 13A and the second coil 13B has been effectively reduced, so the stator 11 does not need a non-magnetic layer; thus, the volume, weight, and cost of the hybrid dual-rotor motor 1 can be significantly decreased.

Figure 6:
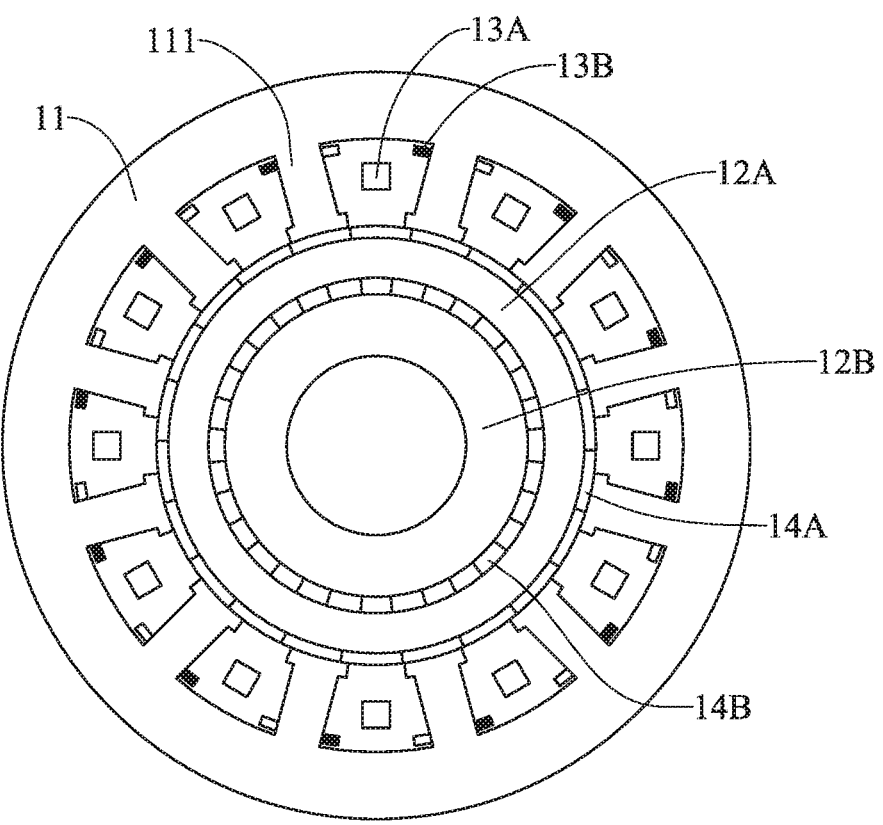
FIG. 6 is the schematic view of the second embodiment of the hybrid dual-rotor motor structure in accordance with the present disclosure.

Please refer to FIG. 6, which is the schematic view of the second embodiment of the hybrid dual-rotor motor structure in accordance with the present disclosure. As shown in FIG. 6, the hybrid dual-rotor motor 1 may include a stator 11, a first rotor 12A, a second rotor 12B, a first coil 13A, and a second coil 13B, a first magnet set 14A, and a second magnet set 14B.

The stator 11, the first rotor 12A, and the second rotor 12B may be arranged in the radial direction of the hybrid dual-rotor motor 1; the stator 11 may include a plurality of stator teeth 111; the first magnet set 14A may be disposed around the outer surface of the first rotor 12A; the second magnet set 14B may be disposed around the outer surface of the second rotor 2B.

The difference between the embodiment and the previous embodiment is that the stator 11 may be, from the radial direction of the hybrid dual-rotor motor 1 to perceive, disposed outside the first rotor 12A and the second rotor 12B. Similarly, in the embodiment, both the first rotor 12A and the second rotor 12B may be permanent-magnet rotor; in another preferred embodiment, one of the first rotor 12A and the second rotor 12B may be permanent-magnet rotor, and the other one of the first rotor 12A and the second rotor 12B may be induction rotor.

The first coil 13A may be wound on the stator teeth 111; the second coil 13B may be wound on the stator teeth 111.

More specifically, the second coil 13B may include a plurality of sub-coil sets, and the sub-coil sets may be connected to each other/one another in series or in parallel; besides, the pole-pair number of the second coil 13B may be an integral multiple of the pole-pair number of the first coil 13A. The first coil 13A and the second coil 13B may be various different kinds of coils, such as toroidal coil, etc. Similarly, in the embodiment, there may be a substantial magnetic flux linkage between the first coil 13A and the second coil 13B; however, the interference of the magnetic flux linkage between the first coil 13A and the second coil 13B cam be minimized by the above structure.

Similarly, the first coil 13A may include a pole-changing structure; the pole-changing structure may include a plurality of switch elements; the pole-changing structure can change the pole number of the first coil 13A by switching the switch elements; similarly, the second coil 13B may also include a pole-changing structure; the pole-changing structure may include a plurality of switch elements; the pole-changing structure can change the pole number of the second coil 13B by switching the switch elements. Therefore, the hybrid dual-rotor motor 1 may provide more different dynamic characteristics by integrating the special pole-changing structure.

Similarly, for the purpose of keeping good independence of the hybrid dual-rotor motor 1 to precisely and independently control the first rotor 12A and the second rotor 12B, the embodiment may also, just like the previous embodiment, use special coil structures to minimize the interference of the magnetic flux linkage between the first coil 13A and the second coil 13B; however, these special coil structures are similar to the previous embodiment, so will not be repeated herein.

Figure 7:
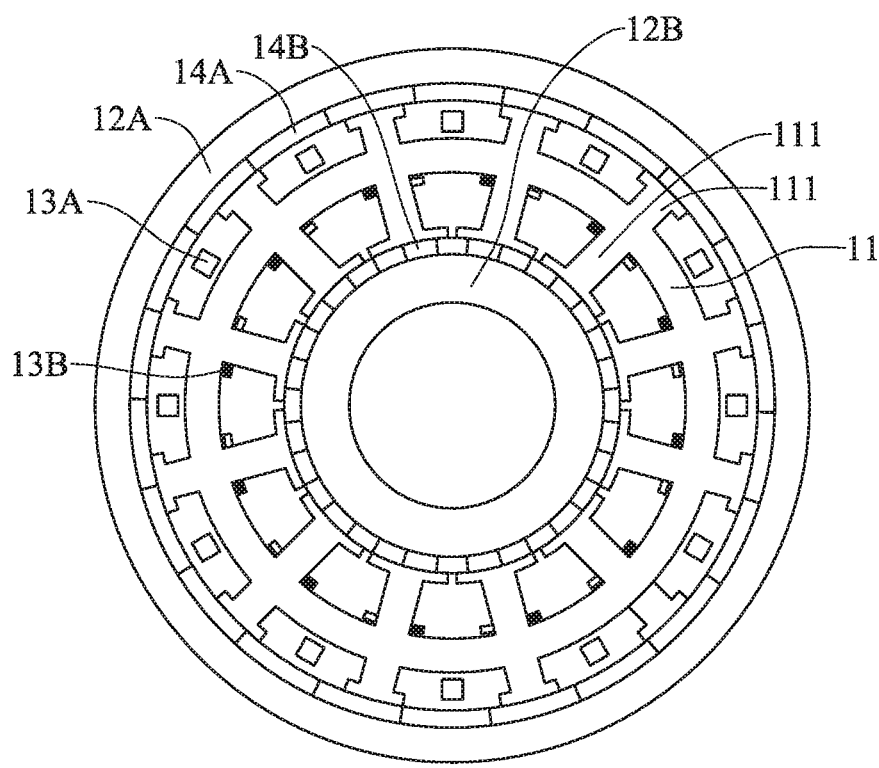
FIG. 7 is the schematic view of the third embodiment of the hybrid dual-rotor motor structure in accordance with the present disclosure.

Please refer to FIG. 7, which is the schematic view of the third embodiment of the hybrid dual-rotor motor structure in accordance with the present disclosure. As shown in FIG. 7, the hybrid dual-rotor motor 1 may include a stator 11, a first rotor 12A, a second rotor 12B, a first coil 13A, and a second coil 13B, a first magnet set 14A, and a second magnet set 14B.

The stator 11, the first rotor 12A, and the second rotor 12B may be arranged in the radial direction of the hybrid dual-rotor motor 1; the stator 11 may include a plurality of stator teeth 111 disposed over the outer surface and the inner surface of the stator 11; the first magnet set 14A may be disposed around the inner surface of the first rotor 12A; the second magnet set 14B may be disposed around the outer surface of the second rotor 2B.

The difference between the embodiment and the previous embodiment is that the stator 11 may be, from the radial direction of the hybrid dual-rotor motor 1 to perceive, disposed between the first rotor 12A and the second rotor 12B. Similarly, in the embodiment, both the first rotor 12A and the second rotor 12B may be permanent-magnet rotor; in another preferred embodiment, one of the first rotor 12A and the second rotor 12B may be permanent-magnet rotor, and the other one of the first rotor 12A and the second rotor 12B may be induction rotor.

The first coil 13A may be wound on the stator teeth 111; the second coil 13B may be wound on the stator teeth 111. More specifically, the second coil 13B may include a plurality of sub-coil sets, and the sub-coil sets may be connected to each other/one another in series or in parallel; besides, the pole-pair number of the second coil 13B may be an integral multiple of the pole-pair number of the first coil 13A. The first coil 13A and the second coil 13B may be various different kinds of coils, such as toroidal coil, etc. Similarly, in the embodiment, there may be a substantial magnetic flux linkage between the first coil 13A and the second coil 13B; however, the interference of the magnetic flux linkage between the first coil 13A and the second coil 13B cam be minimized by the above structure.

Similarly, the first coil 13A may include a pole-changing structure; the pole-changing structure may include a plurality of switch elements; the pole-changing structure can change the pole number of the first coil 13A by switching the switch elements; similarly, the second coil 13B may also include a pole-changing structure; the pole-changing structure may include a plurality of switch elements; the pole-changing structure can change the pole number of the second coil 13B by switching the switch elements. Therefore, the hybrid dual-rotor motor 1 may provide more different dynamic characteristics by integrating the special pole-changing structure.

Similarly, for the purpose of keeping good independence of the hybrid dual-rotor motor 1 to precisely and independently control the first rotor 12A and the second rotor 12B, the embodiment may also, just like the previous embodiment, use special coil structures to minimize the interference of the magnetic flux linkage between the first coil 13A and the second coil 13B; however, these special coil structures are similar to the previous embodiment, so will not be repeated herein.

It is worthy to point out that the stator of conventional dual-rotor motor needs a non-magnetic layer to reduce the interference between multiple coils, which will significantly increase the volume, weight, and cost of conventional dual-rotor motor. On the contrary, according to one embodiment of the present disclosure, the hybrid dual-rotor motor may have two rotors and one stator, and the stator does not need a non-magnetic layer; therefore, the volume, weight, and cost of the hybrid dual-rotor motor can be significantly decreased.

Also, according to one embodiment of the present disclosure, the hybrid dual-rotor motor may use special coil structure to minimize the interference of the magnetic flux linkage between multiple coils, so each of these coils can be driven independently without any difficulties; accordingly, these coils will not interfere with each other, so the performance of the hybrid dual-rotor motor can be optimized.

Due to defective design of conventional dual-rotor motor, its stator cannot have special coil structures, so it cannot provide various different dynamic characteristics. On the contrary, according to one embodiment of the present disclosure, the stator of the hybrid dual-rotor motor may have various coil structures, so the hybrid dual-rotor motor may have different dynamic characteristics; accordingly, the hybrid dual-rotor motor can be more flexible in use, and its application can be more comprehensively.

Besides, due to the defective design of conventional dual-rotor motor, it cannot achieve high torque in low speed and wide speed region. On the contrary, according to one embodiment of the present disclosure, the stator of the hybrid dual-rotor motor may have two coils, and the two coils will not be interfered with each other; therefore, it is possible to determine whether to simultaneously excite both the two coils or excite one of the two coils according to the actual requirements to drive the two rotors so as to various dynamic characteristics, such as high torque, high power and the like; accordingly, the hybrid dual-rotor motor can achieve high torque in low speed and wide speed region.

Figure 8:
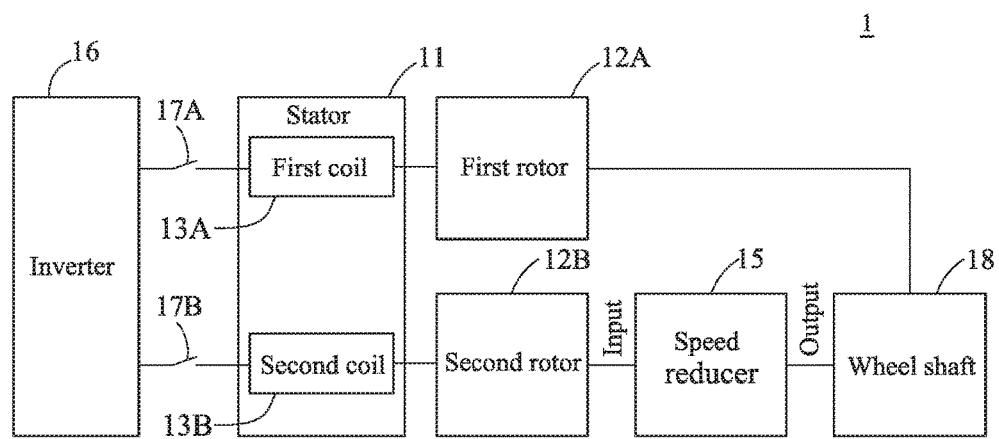
FIG. 8 is the schematic view of the fourth embodiment of the hybrid dual-rotor motor structure in accordance with the present disclosure.

Furthermore, according to one embodiment of the present disclosure, the hybrid dual-rotor motor can achieve high torque in low speed without increasing overall power, so the hybrid dual-rotor motor can still achieve high performance even if limited by space and weight. Therefore, the hybrid dual-motor motor is very suitable for in-wheel motor of electric motor, integrated starter generator (ISG) or other applications with high requirements in space and weight Please refer to FIG. 8, which is the schematic view of the fourth embodiment of the hybrid dual rotor motor structure in accordance with the present disclosure. As shown in FIG. 8, the hybrid dual-rotor motor 1 may include a stator 11, a first rotor 12A, a second rotor 12B, a first coil 13A, a second coil 13B, a speed reducer 15, an inverter 16, and switches 17A, 17B.

The first coil 13A and the second coil 13B may be wound on the stator 11. The inverter 16 may be connected to the first coil 13A via the switch 17A, and connected to the second coil 13B via the switch 17B so as to drive the first rotor 13A and the second rotor 13B respectively. The first rotor 12A may be connected to the wheel shaft 18; the second rotor 12B may be connected to the input of the speed reducer 15, and the output of the speed reducer 15 may be connected to the wheel shaft 18.

If the rotation speed of the wheel shaft 18 is W, and the pole-pair number of the magnet set of the second rotor 12B is 4 times the pole-pair number of the magnet set of the first rotor 12A, the change rate of the electrical angle of the second rotor 12B will also be 4 times the change rate of the electrical angle of the first rotor 12A. Thus, for the purpose of making the phase of the counter-electromotive force of the three-phase coil of the first rotor 12A be the same with that of the second rotor 12B when the first rotor 12A and the second rotor 12B are driven by the same inverter 16, the reduction ratio of the speed reducer 15 may be designed to be 1:4; in other words, the ratio value of the reduction ratio of the speed reducer 15 may be equal to the ratio value of the pole-pair number of the magnet set of the first rotor 12A to the pole-pair number of the magnet set of the second rotor 12B.

When the rotation speed W of the wheel shaft 18 increases to a certain speed, the first rotor 12A may be asynchronous with the second rotor 12B; at this time, one of the first rotor 12A and the second rotor 12B may be selectively disconnected from the inverter 16 via the switches 17A, 17B; in this way, the hybrid dual-rotor motor 1 can stably operate.

Via the above design, the hybrid dual-rotor motor 1 can make the first rotor 12A and the second rotor 12B be synchronous via only one inverter; therefore, the volume, weight, and cost of the hybrid dual-rotor motor 1 can be significantly reduced; moreover, the above design can also allow the hybrid dual-rotor motor 1 to have more dynamic characteristics, so the application of the hybrid dual-rotor motor 1 can be more comprehensive.

It is worthy to point out that conventional dual-rotor motor needs two inverters to drive two rotors respectively, which will increase its cost. On the contrary, according to one embodiment of the present disclosure, the hybrid dual-rotor motor may have a speed reducer, so its two rotors can be driven by only one inverter, so the volume, weight, and cost of the hybrid dual-rotor motor can be further decreased.

In summation of the description above, the hybrid dual-rotor motor structure according to the present disclosure may have the following advantages:

(1) According to one embodiment of the present disclosure, the hybrid dual-rotor motor may have two rotors and one stator, and the stator does not need a non-magnetic layer; therefore, the volume, weight, and cost of the hybrid dual-rotor motor can be significantly decreased.

(2) According to one embodiment of the present disclosure, the hybrid dual-rotor motor may use special coil structure to minimize the interference of the magnetic flux linkage between multiple coils, so each of these coils can be driven independently without any difficulties; accordingly, these coils will not interfere with each other, so the performance of the hybrid dual-rotor motor can be optimized.

(3) According to one embodiment of the present disclosure, the stator of the hybrid dual-rotor motor may have various coil structures, so the hybrid dual-rotor motor may have different dynamic characteristics; accordingly, the hybrid dual-rotor motor can be more flexible in use, and its application can be more comprehensively.

(4) According to one embodiment of the present disclosure, the hybrid dual-rotor motor may have a speed reducer, so its two rotors can be driven by only one inverter, so the volume, weight, and cost of the hybrid dual-rotor motor can be further decreased.

(5) According to one embodiment of the present disclosure, the stator of the hybrid dual-rotor motor may have two coils, and the two coils will not be interfered with each other; therefore, it is possible to determine whether to simultaneously excite both the two coils or excite one of the two coils according to the actual requirements to drive the two rotors so as to various dynamic characteristics, such as high torque, high power and the like. Accordingly, the hybrid dual-rotor motor can achieve high torque in low speed and wide speed region.

(6) According to one embodiment of the present disclosure, the hybrid dual-rotor motor can achieve high torque in low speed without increasing overall power, so the hybrid dual-rotor motor can still achieve high performance even if limited by space and weight. Therefore, the hybrid dual-motor motor is very suitable for in-wheel motor of electric motor, integrated starter generator (ISG) or other applications with high requirements in space and weight.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A hybrid dual-rotor motor structure, comprising:
a stator, comprising a plurality of stator teeth;
a first rotor;
a second rotor, wherein the stator, the first rotor, and the second rotor are arranged in the radial direction of the hybrid dual-rotor motor structure;
a first coil, wound on the stator teeth and connected to the first rotor; and
a second coil, wound on the stator teeth and connected to the second rotor, wherein the second coil comprises a plurality of sub-coil sets; each of the sub-coil sets comprises a plurality of sub-coils connected to each other/one another in series or in parallel; a sum of the pole-pair number of the first coil and a pole-pair number of a magnet set of the first rotor is equal to a quantity of the stator teeth, and the pole-pair number of the second coil is equal to a pole-pair number of a magnet set of the second rotor, whereby a magnetic flux linkage between the first coil and the second coil is able to be further reduced so as to independently control the first rotor and the second rotor.

2. The hybrid dual-rotor motor structure of claim 1, wherein the pole-pair number of the first coil is equal to or greater than 1.

3. The hybrid dual-rotor motor structure of claim 2, wherein a quantity of each of the sub-coil sets is equal to a factor of the integral multiple, and the factor is greater than 1.

4. The hybrid dual-rotor motor structure of claim 3, wherein the sub-coil sets are connected to each other/one another in series.

5. The hybrid dual-rotor motor structure of claim 3, wherein the sub-coil sets are connected to each other/one another in parallel.

6. The hybrid dual-rotor motor structure of claim 4, wherein the sub-coils of each sub-coil set are spaced at regular interval or substantially spaced at regular interval and disposed around 0-360° of a mechanical angle of a periphery of the stator, or 0-360° of an electrical angle of a magnetic field of the first coil.

7. The hybrid dual-rotor motor structure of claim 5, wherein the sub-coils of each sub-coil set are spaced at regular interval or substantially spaced at regular interval and disposed around 0-360° of a mechanical angle of a periphery of the stator, or 0-360° of an electrical angle of a magnetic field of the first coil.

8. The hybrid dual-rotor motor structure of claim 1, wherein the first coil and the second coil are toroidal coils.

9. The hybrid dual-rotor motor structure of claim 1, wherein from a radial direction of the hybrid dual-rotor motor structure to perceive, the stator is disposed between the first rotor and the second rotor.

10. The hybrid dual-rotor motor structure of claim 1, wherein from a radial direction of the hybrid dual-rotor motor structure to perceive, the stator is disposed outside the first rotor and the second rotor.

11. The hybrid dual-rotor motor structure of claim 1, wherein from a radial direction of the hybrid dual-rotor motor structure to perceive, the stator is disposed inside the first rotor and the second rotor.

12. The hybrid dual-rotor motor structure of claim 1, wherein the first rotor and the second rotor are permanent-magnet rotors.

13. The hybrid dual-rotor motor structure of claim 1, wherein one of the first rotor and the second rotor is a permanent-magnet rotor, and the other one of the first rotor and the second rotor is an induction rotor.

14. The hybrid dual-rotor motor structure of claim 1, wherein the first coil further comprises a pole-changing structure, and the pole-changing structure comprises a plurality switch elements, and the pole-changing structure is able to change a pole number of the first coil by switching the switch elements.

15. The hybrid dual-rotor motor structure of claim 1, wherein the second coil further comprises a pole-changing structure, and the pole-changing structure comprises a plurality switch elements, and the pole-changing structure is able to change a pole number of the second coil by switching the switch elements.

16. The hybrid dual-rotor motor structure of claim 1, further comprising a speed reducer and an inverter, wherein the inverter is connected to the first coil and the second coil to drive the first rotor and the second rotor respectively; the first rotor is connected to a wheel shaft, and the second rotor is connected to an input of the speed reducer, and an output of the speed reducer is connected to the wheel shaft.

17. The hybrid dual-rotor motor structure of claim 16, wherein a ratio value of a reduction ratio of the speed reducer is equal to a ratio value of a pole-pair number of a magnet set of the first rotor to a pole-pair number of a magnet set of the second rotor.

18. The hybrid dual-rotor motor structure of claim 17, further comprising a first switch and a second switch, wherein the inverter is connected to the first coil via the first switch, and connected to the second coil via the second switch.

* * * * *